US008843260B2

(12) United States Patent  
 Fukuzawa

(10) Patent No.: US 8,843,260 B2  
(45) Date of Patent: Sep. 23, 2014

(54) CONTROL APPARATUS FOR HYBRID VEHICLE, HYBRID VEHICLE, AND CONTROL METHOD FOR HYBRID VEHICLE

(71) Applicant: Naoya Fukuzawa, Nisshin (JP)

(72) Inventor: Naoya Fukuzawa, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/707,190

(22) Filed: Dec. 6, 2012

(65) Prior Publication Data

US 2013/0151052 A1    Jun. 13, 2013

(30) Foreign Application Priority Data

Dec. 8, 2011  (JP) ................................. 2011-269205

(51) Int. Cl.

| | |
|---|---|
| *B60W 20/00* | (2006.01) |
| *B60W 30/00* | (2006.01) |
| *B60W 10/06* | (2006.01) |
| *B60W 10/08* | (2006.01) |
| *F02N 11/08* | (2006.01) |
| *F02D 37/02* | (2006.01) |
| *B60W 30/18* | (2012.01) |
| *F02D 41/06* | (2006.01) |
| *B60W 30/194* | (2012.01) |
| *F02D 41/02* | (2006.01) |
| *F02P 5/15* | (2006.01) |
| *F02D 41/30* | (2006.01) |

(52) U.S. Cl.

CPC ............... *B60W 20/00* (2013.01); *B60W 10/08* (2013.01); *Y02T 10/26* (2013.01); *F02N 11/0814* (2013.01); *B60W 20/1082* (2013.01); *B60Y 2300/474* (2013.01); *F02D 37/02* (2013.01); *B60W 30/18* (2013.01); *F02D 41/062* (2013.01); *B60W 30/194* (2013.01); *F02D 2200/0602* (2013.01); *F02D 41/0255* (2013.01); *F02P 5/1506* (2013.01); *B60W 10/06* (2013.01); *F02D 41/3094* (2013.01); *Y10S 903/93* (2013.01)

USPC ........................... 701/22; 180/65.21; 903/930

(58) Field of Classification Search

CPC ............................. B60W 20/00; B60W 10/06  
USPC ...................... 701/108–109, 22; 60/272, 281; 180/65.21

See application file for complete search history.

(56) References Cited

U.S. PATENT DOCUMENTS

| | | | |
|---|---|---|---|
| RE36,737 E  * | 6/2000 | Brehob et al. ................ | 123/299 |
| 2005/0109020 A1* | 5/2005 | Ichise et al. ..................... | 60/285 |

(Continued)

FOREIGN PATENT DOCUMENTS

| | | |
|---|---|---|
| JP | 07-293304 A | 11/1995 |
| JP | 08-165929 A | 6/1996 |

(Continued)

*Primary Examiner* — Fadey Jabr  
*Assistant Examiner* — Martin Weeks  
(74) *Attorney, Agent, or Firm* — Gifford, Krass, Sprinkle, Anderson & Citkowski, P.C.

(57) ABSTRACT

An intermittent operation control is executed, wherein a hybrid vehicle is run with a running drive source while an internal combustion engine is intermittently operated in the intermittent operation control. When the internal combustion engine is restarted after a stop due to the intermittent operation control, a rapid warm-up control is executed in which a catalytic converter is rapidly warmed up by retarding the ignition timing of the internal combustion engine. In addition, when the internal combustion engine is restarted, the internal combustion engine is operated only by port injection until the pressure of fuel for in-cylinder injection reaches a reference set pressure. Subsequently, when the pressure of the fuel for in-cylinder injection reaches the reference set pressure, the in-cylinder injection is started.

15 Claims, 6 Drawing Sheets

(56) References Cited

U.S. PATENT DOCUMENTS

| | | |
|---|---|---|
| 2006/0207567 A1 | 9/2006 | Yamaguchi et al. |
| 2006/0225695 A1* | 10/2006 | Fukasawa .................... 123/305 |
| 2008/0147294 A1* | 6/2008 | Tomatsuri et al. ............ 701/102 |
| 2010/0063662 A1* | 3/2010 | Harada et al. .................. 701/22 |

FOREIGN PATENT DOCUMENTS

| | | |
|---|---|---|
| JP | 2002-339838 A | 11/2002 |
| JP | 2006-258032 A | 9/2006 |
| JP | 2007-332936 A | 12/2007 |
| JP | 2010-137596 A | 6/2010 |

\* cited by examiner

CONTROL APPARATUS FOR HYBRID VEHICLE, HYBRID VEHICLE, AND CONTROL METHOD FOR HYBRID VEHICLE

INCORPORATION BY REFERENCE

The disclosure of Japanese Patent Application No. 2011-269205 filed on Dec. 8, 2011 including the specification, drawings and abstract is incorporated herein by reference in its entirety.

BACKGROUND OF THE INVENTION

1. Field of the Invention

The invention relates to a control apparatus for a hybrid vehicle, a hybrid vehicle, and a control method for a hybrid vehicle, in which, of an internal combustion engine and a motor, the internal combustion engine is configured to be intermittently operated.

2. Description of Related Art

In an internal combustion engine mounted on a vehicle, conventionally in-cylinder injection, i.e., direct fuel injection into a cylinder is finely controlled and port injection is used in combination. Fuel efficiency, an output, and combustion stability during a warm-up are improved by controlling the in-cylinder injection and the port injection. In such an internal combustion engine, the combustion in the cylinder is retarded to such a degree that the combustion is performed in the exhaust stroke by significantly retarding ignition timing. Thus, by retarding the combustion in the cylinder, an exhaust temperature is increased and a catalytic converter for exhaust gas purification is rapidly warmed up (hereinafter this warm-up is referred to as a catalyst rapid warm-up).

On the other hand, in recent years, a following hybrid vehicle has become prevalent. In the hybrid vehicle, a reduction in idling time and energy regeneration are performed by using the internal combustion engine and a motor (inclusive of a generator) in combination, and thus a significant reduction in fuel consumption has been realized. As a result, in the hybrid vehicle, the internal combustion engine can be reduced in size. In addition, the hybrid vehicle in which, by running with the motor under a running condition that the efficiency of the internal combustion engine is reduced, the intermittent operation of the internal combustion engine during the running is executed and the effect of reducing the fuel consumption is thereby enhanced is becoming prevalent. Further, the hybrid vehicle in which the fuel efficiency and exhaust gas purification performance are improved by using the internal combustion engine configured to perform the in-cylinder injection is also becoming prevalent.

Incidentally, when the cooling system of the internal combustion engine is stopped at the same time as the stop of the internal combustion engine, a fuel vapor becomes likely to occur in the fuel supply system of the internal combustion engine. For example, when the fuel vapor becomes likely to occur, a low-pressure fuel pump in the fuel supply system is driven by the motor. By driving the low-pressure fuel pump, a fuel pressure level higher than the vapor pressure level of the fuel is secured and the occurrence of the fuel vapor is thereby reduced.

In addition, during a temporary stop due to the intermittent operation of the internal combustion engine, the low-pressure fuel pump is stopped and a required fuel pressure is secured when the internal combustion engine is restarted after the temporary stop. At this point, in order to secure the required fuel pressure, the opening of an electromagnetic relief valve connected to a high-pressure delivery pipe is prohibited. On the other hand, during the stop of the internal combustion engine when the operation thereof is ended, the leakage of the fuel by opening the electromagnetic relief valve is allowed such that the fuel is not leaked from a fuel injection valve by a temporary increase in temperature due to the stop of the cooling system.

However, in the control apparatus for a hybrid vehicle described above, the internal combustion engine is intermittently driven and the frequency of repetition of driving and stopping becomes relatively high. As a result, especially in cases shown below, the high-pressure side fuel pressure tends to be reduced.

For example, there are cases where an orifice leak mechanism is used in combination with a pressure control valve. The pressure control valve limits the pressure of the fuel discharged from a high-pressure pump to a set high pressure and maintains the pressure at the set pressure. For example, the pressure control valve is a relief valve or a pressure regulator. The orifice leak mechanism prevents fuel leakage from the fuel injection valve during high-temperature soak. Alternatively, there are cases where the orifice leak mechanism that replaces the above pressure control valve is used. In such a configuration, the high-pressure side fuel pressure has tended to be reduced every time the intermittent stop is performed.

As a result, when the internal combustion engine is restarted after the temporary stop due to the intermittent operation, there has been a possibility that the fuel pressure increase for injecting the fuel required for the catalyst rapid warm-up into the cylinder is retarded. With the retardation, there has been a possibility that a fluctuation in air-fuel ratio (what is called an air-fuel ratio variation) or an interruption of the in-cylinder injection is caused and the catalyst rapid warm-up is adversely affected.

In addition, in a case where the in-cylinder injection and the port injection are used in combination as well, when the internal combustion engine is restarted after the temporary stop of the internal combustion engine due to the intermittent operation, the fuel injection amount of the in-cylinder injection fluctuates. As a result, similarly to the above case, there has been a possibility that the catalyst rapid warm-up is adversely affected.

SUMMARY OF THE INVENTION

In view of the foregoing, the invention provides a control apparatus for a hybrid vehicle, a hybrid vehicle, and a control method for a hybrid vehicle that, when the internal combustion engine is restarted after the temporary stop of the internal combustion engine due to the intermittent operation, reduce an influence by the fluctuation in in-cylinder injection amount resulting from the retardation of the fuel pressure increase.

A first aspect of the invention is a control apparatus provided in a hybrid vehicle. The hybrid vehicle includes a running drive source and a catalytic converter for exhaust gas purification. The running drive source has a motor and an internal combustion engine capable of in-cylinder injection and port injection. The catalytic converter is provided on an exhaust path of the internal combustion engine. In addition, the control apparatus includes a control unit that is configured to: execute an intermittent operation control in which, while the internal combustion engine is intermittently operated, the hybrid vehicle is run with the running drive source; when the internal combustion engine is restarted after a stop of the internal combustion engine due to the intermittent operation control, execute a catalyst rapid warm-up control in which the catalytic converter is rapidly warmed up by retarding ignition timing of the internal combustion engine; when the internal combustion engine is restarted, operate the internal combustion engine only by the port injection until a pressure of fuel for the in-cylinder injection reaches a preset reference set pressure; and start the in-cylinder injection when the pressure of the fuel for the in-cylinder injection reaches the reference set pressure.

Consequently, when the internal combustion engine is restarted after a temporary stop due to the intermittent operation (hereinafter also referred to as an intermittent stop), the internal combustion engine is initially operated only by the port injection. Then, when the pressure of the fuel for the in-cylinder injection reaches the reference set pressure, the in-cylinder injection is started. As a result, an air-fuel ratio variation is prevented or reduced, and the catalyst rapid warm-up is reliably executed. The air-fuel ratio variation is caused by a fluctuation in in-cylinder injection amount resulting from a retarded increase in the pressure of the fuel for the in-cylinder injection. Therefore, required exhaust gas purification performance by the catalytic converter is sufficiently secured.

A second aspect of the invention is a hybrid vehicle including a running drive source, a catalytic converter for exhaust gas purification, and a control apparatus. The running drive source has a motor and an internal combustion engine configured to execute in-cylinder injection and port injection. The catalytic converter for exhaust gas purification is provided on an exhaust path of the internal combustion engine. The control apparatus is configured to: execute an intermittent operation control in which, while the internal combustion engine is intermittently operated, the hybrid vehicle is run with the running drive source; when the internal combustion engine is restarted after a stop of the internal combustion engine due to the intermittent operation control, execute a catalyst rapid warm-up control in which the catalytic converter is rapidly warmed up by retarding ignition timing of the internal combustion engine; when the internal combustion engine is restarted, operate the internal combustion engine only by the port injection until a pressure of fuel for the in-cylinder injection reaches a preset reference set pressure; and start the in-cylinder injection when the pressure of the fuel for the in-cylinder injection reaches the reference set pressure.

A third aspect of the invention is a control method for a hybrid vehicle. The hybrid vehicle has a running drive source and a catalytic converter for exhaust gas purification. The running drive source has a motor and an internal combustion engine configured to execute in-cylinder injection and port injection. In addition, the catalytic converter is provided on an exhaust path of the internal combustion engine. The control method includes: executing an intermittent operation control in which, while the internal combustion engine is intermittently operated, the hybrid vehicle is run with the running drive source; when the internal combustion engine is restarted after a stop of the internal combustion engine due to the intermittent operation control, executing a catalyst rapid warm-up control in which the catalytic converter is rapidly warmed up by retarding ignition time of the internal combustion engine; operating the internal combustion engine only by the port injection until a pressure of fuel for the in-cylinder injection reaches a preset reference set pressure when the internal combustion engine is restarted; and starting the in-cylinder injection when the pressure of the fuel for the in-cylinder injection reaches the reference set pressure.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinbelow, an embodiment of the invention will be described with reference to the drawings.

Figure 1:
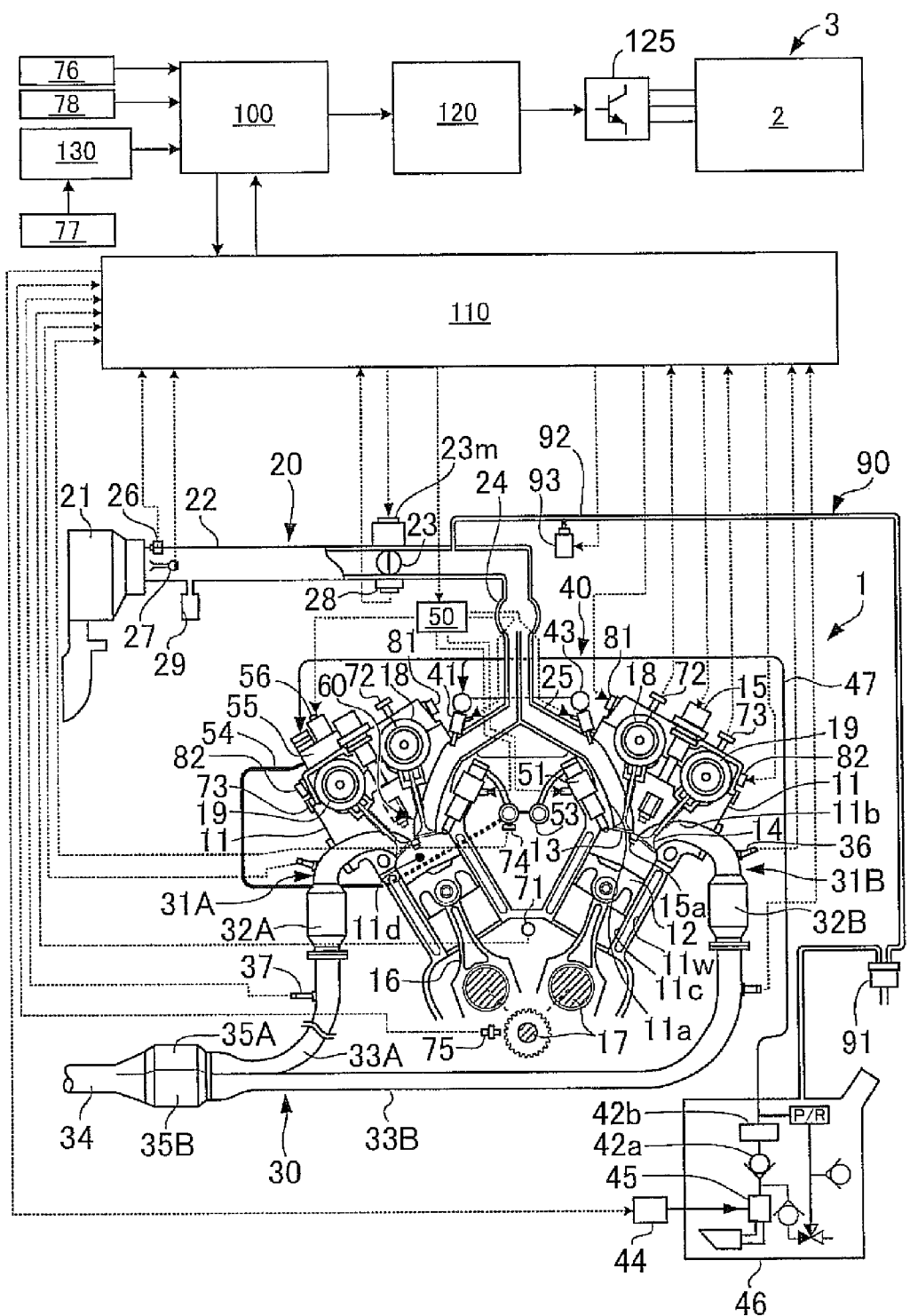
FIG. 1 is a view showing a schematic configuration of an internal combustion engine and its control apparatus according to an embodiment of the invention.
Figure 2:
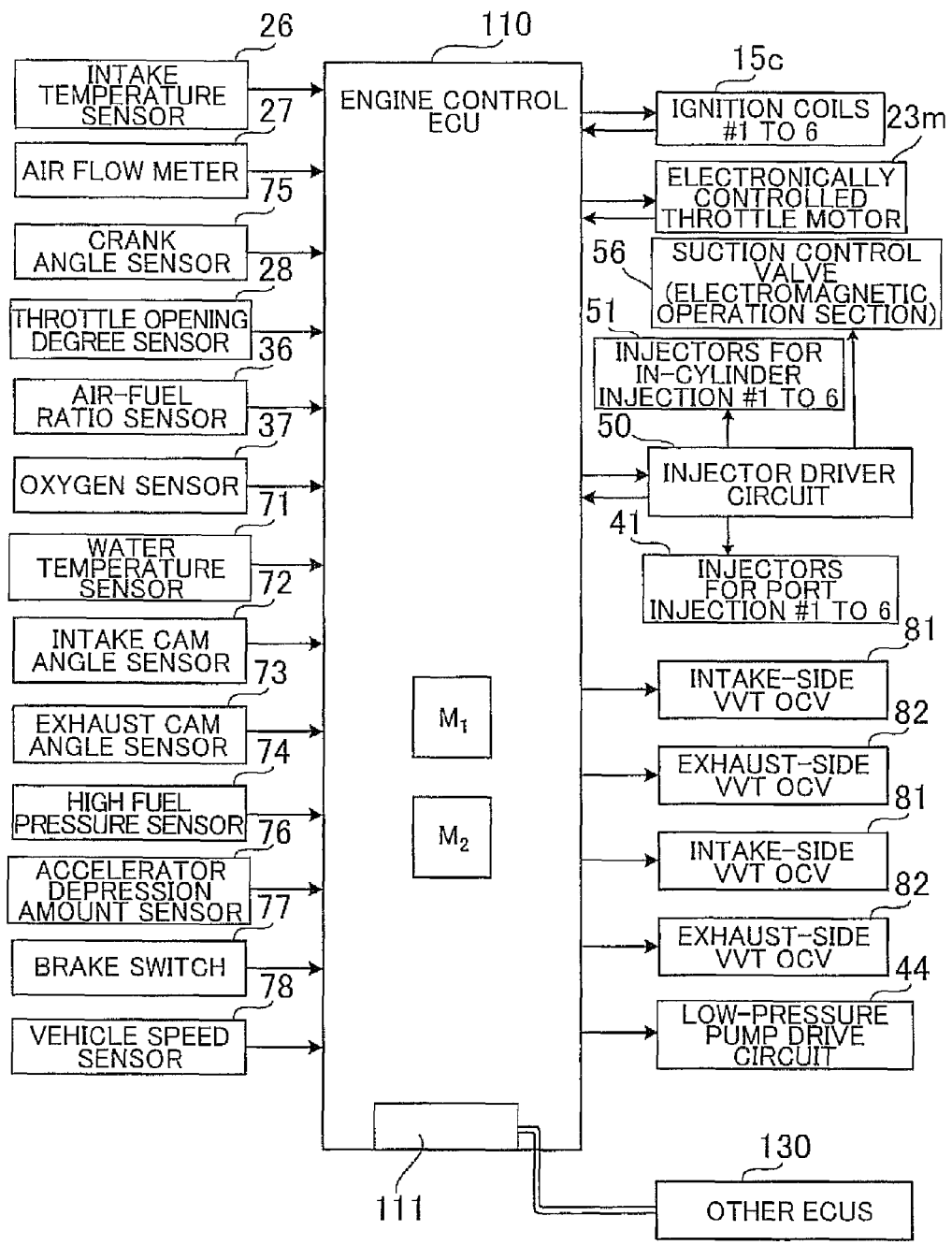
FIG. 2 is a block diagram showing a schematic configuration of the control apparatus for a hybrid vehicle according to the embodiment of the invention.
Figure 3:
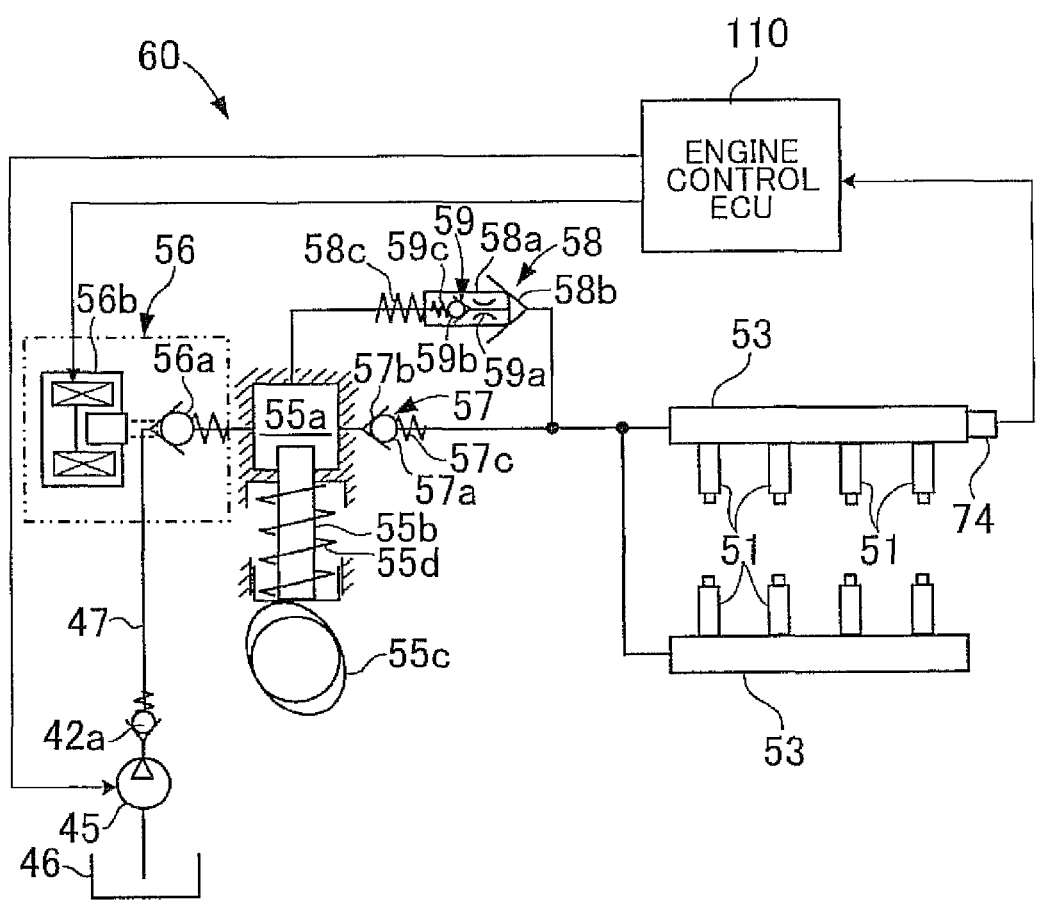
FIG. 3 is a view showing a schematic configuration of a high-pressure side fuel supply device of the internal combustion engine in the hybrid vehicle according to the embodiment of the invention.
Figure 4:
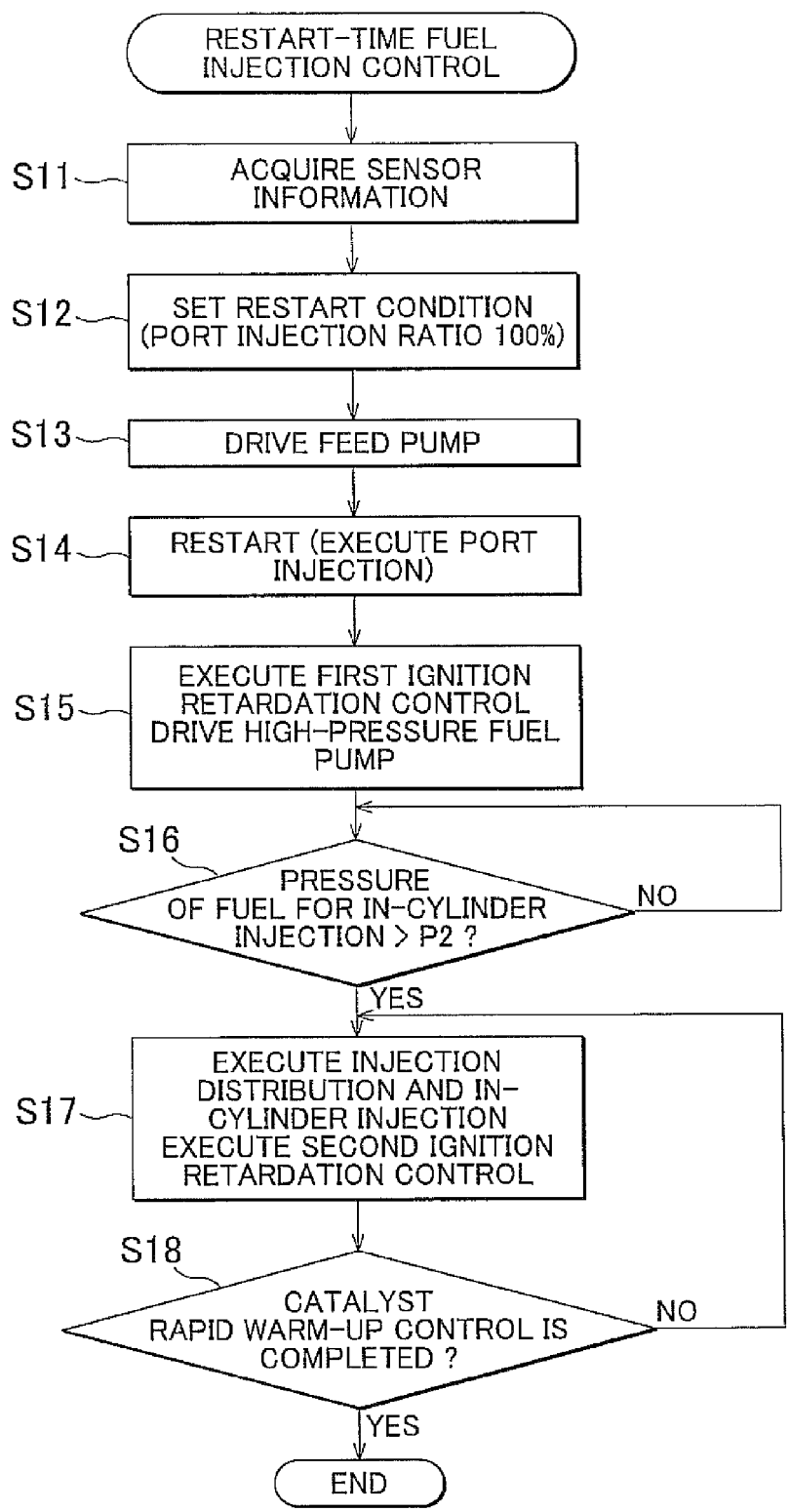
FIG. 4 is a flowchart showing the general procedure of a fuel injection control at the time of restart in the control apparatus for the hybrid vehicle according to the embodiment of the invention.
Figure 5:
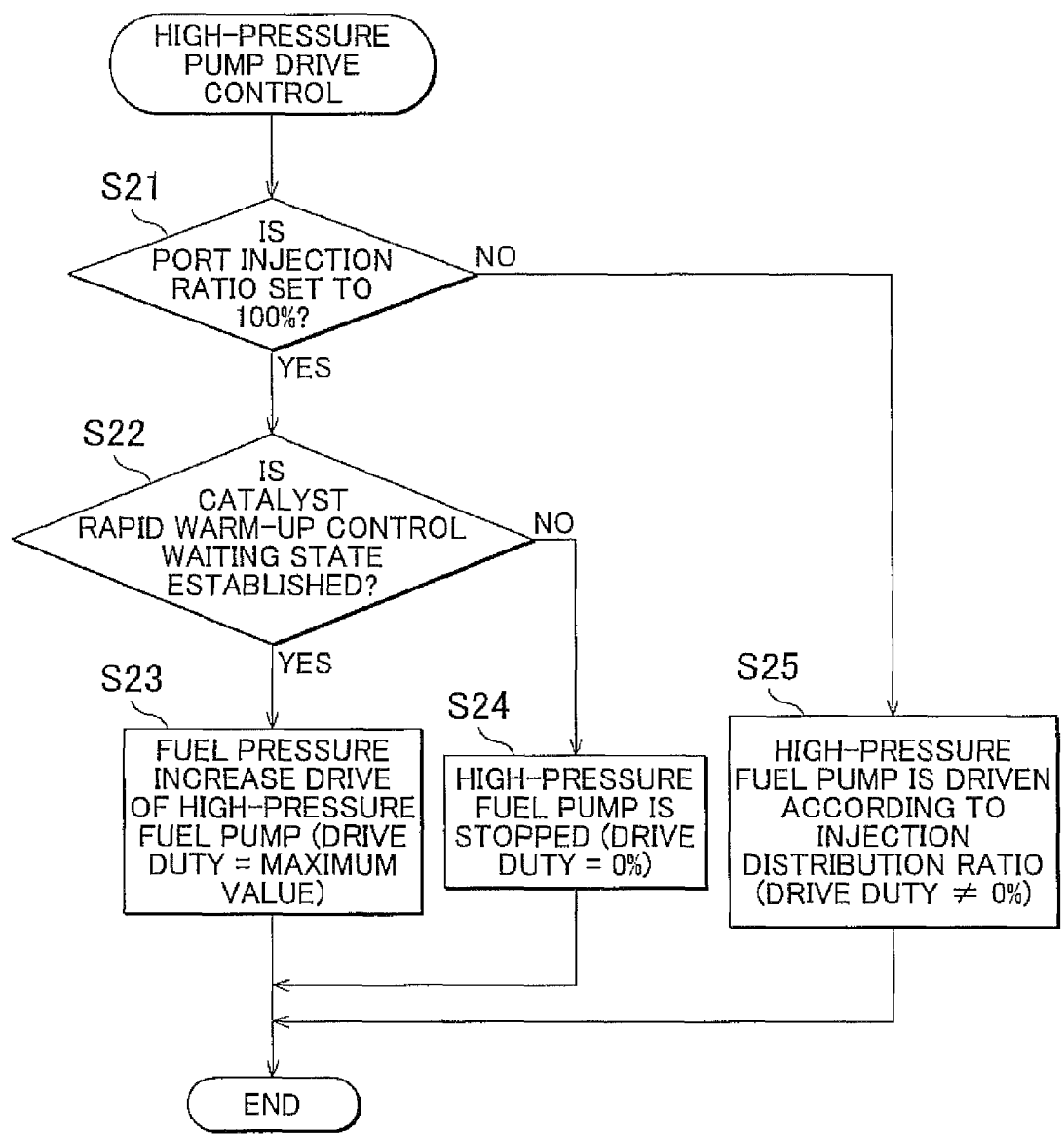
FIG. 5 is a flowchart showing the general flow of a drive control of a high-pressure fuel pump in the control apparatus for the hybrid vehicle according to the embodiment of the invention.
Figure 6:
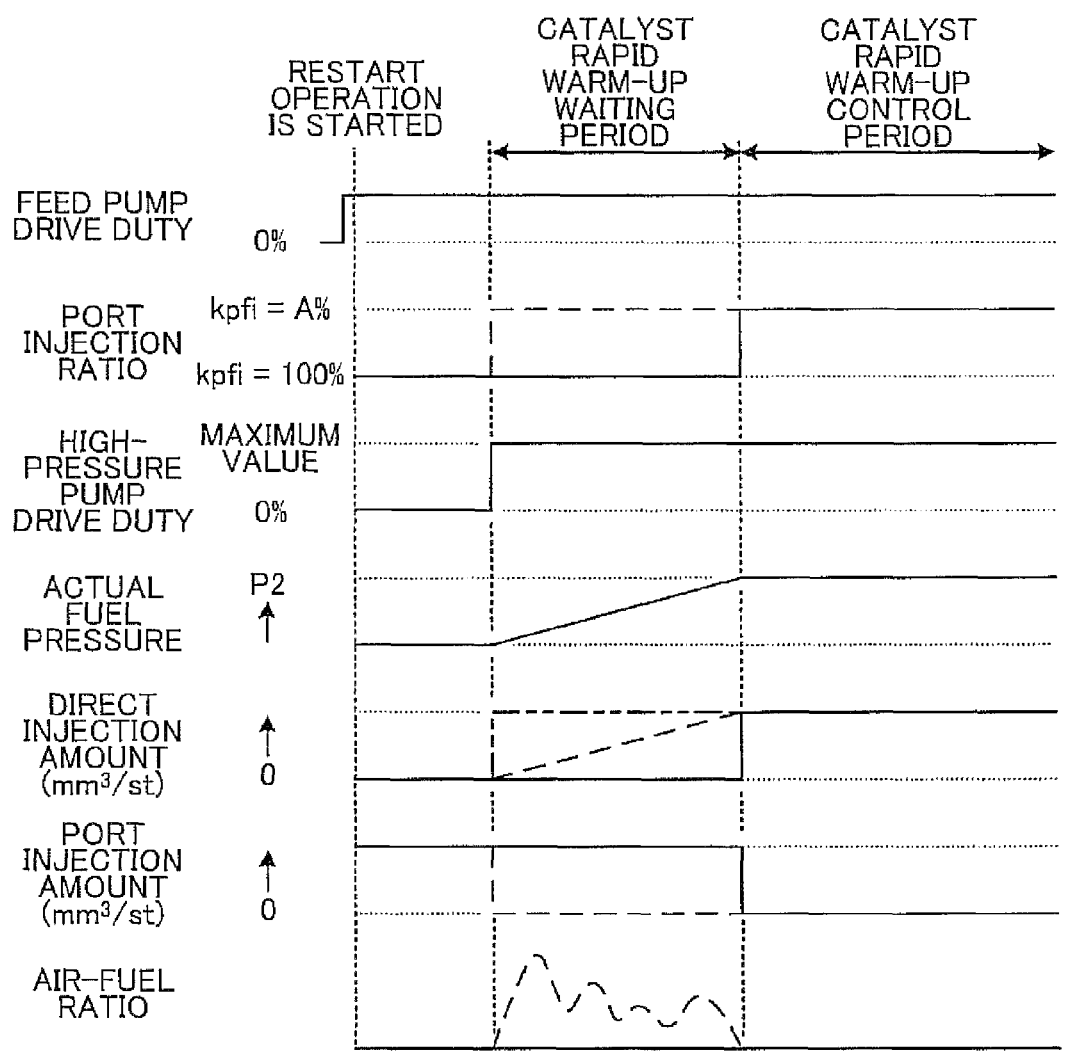
FIG. 6 is a timing chart explaining an injection control at the time of restart in the control apparatus for the hybrid vehicle according to the embodiment of the invention.

FIGS. 1 to 3 show schematic configurations of a running driving source of a hybrid vehicle and its control apparatus according to the embodiment of the invention. FIGS. 4 to 6 show the outline of an injection control at the time of restart of an internal combustion engine by the control apparatus.

The hybrid vehicle of the embodiment is an automobile on which a hybrid drive system using an internal combustion engine and a generator-motor in combination is mounted as the running drive source. The internal combustion engine mounted on the hybrid vehicle of the embodiment adopts a dual injection system in order to respond to high-level requests for improvements in the fuel efficiency and output of the running drive source and the exhaust gas purification performance of the hybrid vehicle. In the dual injection system, a fuel injection valve for port injection and a fuel injection valve for in-cylinder injection are used in combination.

First, the configuration of the embodiment shown in FIGS. 1 to 3 will be described.

As shown in FIGS. 1 and 2, the hybrid vehicle of the embodiment includes a hybrid drive device 3 as the running drive source controlled in accordance with a requested output. The hybrid drive device 3 includes an engine 1 as the internal combustion engine and at least one motor 2 capable of generating power.

The hybrid drive device 3 is controlled by a hybrid drive control electronic control unit (ECU) 100, an engine control ECU 110, a motor control ECU 120, and a brake control ECU 130. In addition, the hybrid drive device 3 generates a running drive force that runs the vehicle in accordance with power outputted from at least one of the engine 1 and the motor 2.

The engine 1 is constituted by a spark-ignition multi-cylinder internal combustion engine, e.g., a V-type six-cylinder (multi-cylinder) four-cycle gasoline engine. In addition, the motor 2 is accommodated in a transmission case (not shown) and the transmission case is fixed to the engine 1.

The motor 2 is configured as, e.g., a permanent magnet synchronous generator-motor, and has the function as a motor of converting supplied electric power to rotational power and outputting the rotational power and the function as a generator of converting inputted rotational power to electric power and outputting the electric power. The motor 2 may be constituted by a first generator-motor mainly used as the generator and a second generator-motor mainly used as the motor.

More specifically, the motor 2 has, e.g., an interior magnet rotor and a stator around which a three-phase coil is wound. In the interior magnet rotor, a plurality of permanent magnets are disposed substantially in the shape of V and a reluctance torque is thereby utilized. In the motor 2, when the stator receives the supply of AC power from an inverter 125 controlled by the motor control ECU 120 to generate a revolving magnetic field, the rotor rotates by the rotating magnetic field. In addition, the motor 2 is provided with a resolver (not shown) for detecting the rotational angle position of the rotor.

The hybrid drive device 3 transmits the rotational power outputted from at least one of the engine 1 and the motor 2 to drive wheels for running (not shown) via a power distribution integration mechanism, a reduction gear mechanism, and a differential mechanism that are not shown.

Specifically, in the engine 1, a piston 12 is accommodated in each cylinder 11c of a pair of right and left banks 11, and a combustion chamber 11d is defined. In addition, in each cylinder 11c, intake valves 13 and exhaust valves 14 are provided. Further, in the engine 1, direct ignition type ignition devices 15 are provided. Each ignition device 15 has a spark plug 15a exposed in the combustion chamber 11d and an ignition coil (not shown) for igniting the spark plug 15a. A plurality of the pistons 12 in the pair of right and left banks 11 are coupled to crank shafts 17 (the details thereof are not shown) via connecting rods 16. In addition, a water jacket 11w is formed around each cylinder 11c of the pair of right and left banks 11.

In the engine 1, valve timings of the intake valve 13 and the exhaust valve 14 of each of the plurality of the cylinders 11c are variably controlled to be an intake timing or an exhaust timing according to the operation state of the engine 1 by a conventional intake-side variable valve timing mechanism (VVT) 18 and a conventional exhaust-side VVT 19.

On the side of a first wall surface where the pair of banks 11 of the engine 1 are close to each other, a plurality of intake ports 11a are formed. On the side of a second wall surface where the pair of banks 11 are apart from each other, a plurality of exhaust ports 11b are formed. In addition, between the upper end portions of the pair of banks 11 on the first wall surface side, there is provided an intake manifold 25 that can distribute intake air to the plurality of the intake ports 11a of the pair of banks 11. On the second wall surface side of the pair of banks 11, there are provided exhaust manifolds 31A and 31B that collect exhaust gas discharged from the plurality of the exhaust ports 11b.

The intake manifold 25 constitutes a conventional intake device 20 together with an air cleaner 21, an intake pipe 22, an electronically controlled throttle valve 23, and a surge tank 24.

The exhaust manifold 31A and 31B constitute a conventional exhaust device 30 together with first catalytic converters 32A and 32B, middle exhaust pipes 33A and 33B, a downstream-side exhaust pipe 34, second catalytic converters 35A and 35B, and an exhaust muffler (not shown).

Herein, each of the first catalytic converters 32A and 32B and the second catalytic converters 35A and 35B is constituted by a three-way catalyst for exhaust gas purification provided on the exhaust path of the engine 1. The exhaust gas having passed through the first catalytic converters 32A and 32B and the exhaust pipes 33A and 33B is collected in the downstream-side exhaust pipe 34 after passing through the second catalytic converters 35A and 35B, and is discharged to the outside through the exhaust muffler provided midway in the downstream-side exhaust pipe 34.

In the plurality of the intake ports 11a of the engine 1, there are provided a plurality of first injectors 41 for port injection (a port injection valve, a low-pressure fuel injection valve) that correspond to the plurality of the cylinders 11c. The plurality of the first injectors 41 are connected to a feed pump 45 for fuel supply via a pair of low-pressure delivery pipes 43.

The feed pump 45 pumps up fuel in a fuel tank 46, e.g., gasoline and pressurizes the fuel to a first pressure level corresponding to the pressure of the fuel for port injection, although this is not shown in the figures. Subsequently, the feed pump 45 feeds the fuel to each of the pair of low-pressure delivery pipes 43 through a discharge check valve 42a, a fuel filter 42b, and a low-pressure fuel passage 47. That is, the feed pump 45 constitutes a low-pressure side fuel supply device 40 together with the discharge check valve 42a, the fuel filter 42b, and the low-pressure fuel passage 47. The low-pressure side fuel supply device 40 is configured to feed and supply the fuel for port injection to each low-pressure delivery pipe 43.

The feed pump 45 is subjected to ON/OFF drive and a rotational speed control via a low-pressure pump drive circuit 44 (see FIG. 2) on the basis of a pump control signal from the engine control ECU 110 described later. For example, the feed pump 45 is a low-pressure side discharge-pressure variable fuel pump that changes a discharge flow rate and a feed fuel pressure by changing the rotational speed of its motor-driven pump rotor.

On the other hand, in the plurality of the cylinders 11c of the engine 1, there are provided a plurality of second injectors 51 for in-cylinder injection (an in-cylinder injection valve, a high-pressure fuel injection valve) that directly inject high-pressure fuel into the corresponding combustion chambers 11d. The second injectors 51 are connected to a plunger-type high-pressure fuel pump 55 via a pair of high-pressure delivery pipes 53 and a high-pressure fuel pipe 54. The plunger-type high-pressure fuel pump 55 is provided in the upper portion of one of the banks 11.

As shown in FIG. 3, the high-pressure fuel pump 55 has a pressure chamber 55a, a plunger 55b, and a drive cam 55c. The fuel supplied from the feed pump 45 is introduced into the pressure chamber 55a. The plunger 55b pressurizes the fuel in the pressure chamber 55a to a second fuel pressure level higher than the first fuel pressure level as the feed pressure level. The drive cam 55c rotates by power from the engine 1 and drives the plunger 55b in a fuel pressurization direction against a reaction force of a return spring 55d. The second fuel pressure level mentioned herein is a fuel pressure for in-cylinder injection that is suitable for the in-cylinder injection by the second injector 51.

In addition, on the intake side of the high-pressure fuel pump 55, there is provided a suction control valve 56 of an electromagnetic spill valve type. On the discharge side of the high-pressure fuel pump 55, there are provided a discharge valve 57 and a relief valve 58 having an orifice leak mechanism 59. The high-pressure fuel pump 55, the suction control valve 56, the discharge valve 57, and the relief valve 58 constitute a high-pressure side fuel supply device 60. The high-pressure side fuel supply device 60 is configured to supply fuel for in-Cylinder injection to the engine 1.

The suction control valve 56 is provided at the downstream end portion on of the low-pressure fuel passage 47 connected to the feed pump 45 side of the pressure chamber 55a. In addition, the suction control valve 56 has an electromagnetic operation section 56b. The electromagnetic operation section 56b operates a ball valve body 56a in a valve-opening direction. Herein, the ball valve body 56a is a check valve body that opens and closes a part of the low-pressure fuel passage 47. The suction control valve 56 executes a valve-opening operation in response to the operation of the electromagnetic operation section 56b. In the valve-opening operation, the pressure chamber 55a is opened to a portion of the low-pressure fuel passage 47 located upstream of the ball valve body 56a. Further, the suction control valve 56 executes a checking/valve-closing operation in response to the operation of the electromagnetic operation section 56b. In the checking/valve-closing operation, the pressure chamber 55a is secluded from the portion of the low-pressure fuel passage 47 located upstream of the ball valve body 56a. With this arrangement, the suction control valve 56 closes when a drive signal from the engine control ECU 110 is inputted to exert its check valve function. That is, the suction control valve 56 checks backflow of high-pressure fuel in the fuel introduction opening portion of the pressure chamber 55a of the high-pressure fuel pump 55. The fuel introduction opening portion of the pressure chamber 55a is connected to the low-pressure fuel passage 47 on the feed pump 45 side. On the other hand, when the input of the drive signal is stopped and the suction control valve 56 opens, the suction control valve 56 leaks the high-pressure fuel in the pressure chamber 55a to the low-pressure side.

The high-pressure fuel pump 55 drives the plunger 55b in a fuel pressurization direction when the suction control valve 56 closes. By driving the plunger 55b in the fuel pressurization direction, the high-pressure fuel pump 55 discharges the high-pressure fuel to the side of the pair of high-pressure delivery pipes 53. At this point, the high-pressure fuel is pressurized to the second fuel pressure level. In addition, by controlling valve-closing time of the suction control valve 56, the discharge flow rate of the high-pressure fuel pump 55 is controlled.

The discharge valve 57 allows the discharge of the fuel to the side of the pair of high-pressure delivery pipes 53 from the pressure chamber 55a of the high-pressure fuel pump 55. On the other hand, the discharge valve 57 has the function as the check valve that checks the backflow of the high-pressure fuel discharged to the high-pressure delivery pipe 53 side. The discharge valve 57 is constituted by a check valve body 57a, a valve seat 57b, and a valve spring 57c. The valve spring 57c regulates the valve-opening differential pressure of the check valve body 57a.

The relief valve 58 is constituted by a relief valve body 58a, a valve seat 58b, and a valve spring 58c. In the relief valve 58, the valve-opening differential pressure of the relief valve body 58a is regulated by the valve spring 58c. The fuel bypasses the discharge valve 57 through the relief valve 58. Also, in contrast to the discharge valve 57, the relief valve 58 serves as a check valve mechanism that discharges the fuel to the pressure chamber 55a. The valve-opening set pressure of the relief valve 58 is set to a pressure high enough to prevent the pressure of the high-pressure fuel on the high-pressure delivery pipe 53 side from becoming an abnormally high pressure.

The orifice leak mechanism 59 has a throttle passage 59a, a check valve body 59b, and a valve spring 59c. The throttle passage 59a is formed inside the relief valve body 58a of the relief valve 58. The check valve body 59b is accommodated inside the relief valve body 58a so as to check the leakage of the pressure of the pressure chamber 55a of the high-pressure fuel pump 55. The valve spring 59c biases the check valve body 59b in a valve-closing direction. The check valve body 59b cooperates with the throttle passage 59a to reliably open the discharge valve 57 in a stage where the fuel pressure of the pressure chamber 55a is increasing. In addition, when the pressure of the fuel to the high-pressure delivery pipe 53 side is increased to such a degree that fuel leakage from the second injector 51 may be caused, the check valve body 59b opens against the biasing force of the valve spring 59c. With this, the check valve body 59b suppresses a further increase in the pressure of the fuel on the high-pressure delivery pipe 53 side. Note that, in FIG. 3, although the orifice leak mechanism 59 is accommodated inside the relief valve body 58a of the relief valve 58, the orifice leak mechanism 59 may also be provided in parallel with the relief valve 58.

As shown in FIG. 2, the first injectors 41, the second injectors 51, and the suction control valve 56 are connected to an injector driver circuit 50 and are controlled by the engine control ECU 110 via the injector driver circuit 50.

The injector driver circuit 50 has a signal conversion circuit. When a control signal (an injector drive signal, a fuel injection request signal, a high-pressure fuel injection amount signal, or the like) from the engine control ECU 110 is inputted to the injector driver circuit 50, the signal conversion circuit converts the control signal to a high-voltage/high-current drive signal. Subsequently, the injector driver circuit 50 controls the drive of, among the first injectors 41, the second injectors 51, and the suction control valve 56, a control target corresponding to the control signal from the engine control ECU 110.

In the intake device 20, sensors such as an intake temperature sensor 26, an air flow meter 27, and a throttle opening degree sensor 28 are provided, and a resonator 29 is attached.

In the exhaust device 30, an air-fuel ratio sensor 36 and an oxygen sensor 37 are provided. The air-fuel ratio sensor 36 detects the state of the air-fuel ratio in exhaust gas on the upstream of the first catalytic converters 32A and 32B. The oxygen sensor 37 detects the concentration of oxygen in the exhaust gas between the first catalytic converters 32A and 32B and the second catalytic converters 35A and 35B.

In the engine 1, there are further provided a water temperature sensor 71, intake and exhaust cam angle sensors 72 and 73, a high fuel pressure sensor 74, a crank angle sensor 75, and a knock control sensor (without a reference numeral). The water temperature sensor 71 detects the temperature of cooling water passing through the water jacket 11w (the temperature of the engine). The high fuel pressure sensor 74 detects the pressure of the fuel supplied to the pair of high-pressure delivery pipes 53 from the high-pressure fuel pump 55. The crank angle sensor 75 detects an angle, position and a rotational speed at each predetermined rotational angle of the crank shaft 17. Sensor information from the above sensors is captured into the engine control ECU 110.

Although the detailed hardware configuration of each of the hybrid drive control ECU 100, the engine control ECU 110, the motor control ECU 120, and the brake control ECU 130 is not depicted in the drawing, each of the hybrid drive control ECU 100, the engine control ECU 110, the motor control ECU 120, and the brake control ECU 130 is provided with a central processing unit (CPU), a read-only memory (ROM), a random-access memory (RAM), and a backup memory. Further, each of the hybrid drive control ECU 100, the engine control ECU 110, the motor control ECU 120, and the brake control ECU 130 includes an input interface circuit, an output interface circuit, a constant-voltage circuit, and a communication interface circuit for communication with other vehicle-mounted ECUs. The input interface circuit has analog-to-digital (A/D) conversion circuit, while the output interface circuit has a driver circuit.

The hybrid drive control ECU 100 includes an integrated control program. The integrated control program integrally controls the engine 1 and the motor 2 such that they operate in response to a requested output. The requested output (requested power) mentioned herein is a requested output according to an accelerator pedal operation amount by a driver, requested output requested from another running control function such as a cruise control or the like, or a requested output calculated based on a plurality of such requested outputs.

The hybrid drive control ECU 100 calculates various command values based on, e.g., a requested accelerator depression amount from an accelerator depression amount sensor 76, a requested value of a drive force division ratio from the brake control ECU 130, a vehicle speed signal from a vehicle speed sensor 78, and an engine rotation speed from the crank angle sensor 75 in the engine 1. The drive force division ratio mentioned herein is a ratio between power from the engine 1 distributed for running drive and power distributed the engine 1 to the motor 2 for operating the motor 2 as the generator. For example, the hybrid drive control ECU 100 calculates a total output value of the hybrid drive device 3, a power command value and the engine rotation speed required of the engine 1, and a torque command value to the motor 2. Subsequently, the hybrid drive control ECU 100 outputs the power command value and the engine rotation speed command value to the engine control ECU 110, and also outputs the torque command value to the motor control ECU 120.

That is, the hybrid drive control ECU 100 outputs the command values to the engine control ECU 110 and the motor control ECU 120 such that the hybrid vehicle is run by the power outputted from at least one of the engine 1 and the motor 2.

In addition, the hybrid drive control ECU 100 executes an intermittent operation control in accordance with a plurality of control programs pre-stored in the ROM on the basis of sensor information and set value information while performing communication with other vehicle-mounted ECUs. The intermittent operation control mentioned herein is a control in which the hybrid vehicle is run with the hybrid drive device 3 while the engine 1 is intermittently operated.

More specifically, the intermittent operation control mentioned herein includes the following first, second, and third controls: the first control is a control in which the drive state of the hybrid drive device 3 is switched between the running drive state by the engine 1 and the running drive state by the motor 2 during the running of the vehicle; the second control is a control in which the drive state of the hybrid drive device 3 is switched between the running drive state by the engine 1 and the motor 2 and the running drive state only by the motor 2; and the third control is a control in which, after running by one of the engine 1 and the motor 2, the running is resumed by the other of the engine 1 and the motor 2. That is, the intermittent operation control includes a control in a case where the engine 1 is restarted from the motor running state by the motor 2 or a regenerative braking state, and a control in a case where the engine 1 is restarted after the automatic stop of the engine 1 due to what is called an idling stop control.

Further, the hybrid drive control ECU 100 constantly grasps the discharge amount and regenerative amount of a hybrid drive battery based on monitoring information from a power source monitoring unit, which is not inside figures. Furthermore, the hybrid drive control ECU 100 calculates a state of charge (SOC) [%] that corresponds to a charge amount ratio relative to the total battery capacity of the hybrid drive battery. Then, the hybrid drive control ECU 100 limits the fluctuation range of the SOC to a predetermined use fluctuation range set in consideration of the reliability and life of the hybrid drive battery.

In addition, the hybrid drive control ECU 100 cooperates with the brake control ECU 130 to execute a traction control. In the traction control, when the drive force suddenly starts to change due to tire slip or the like on a low μ road, the hybrid drive control ECU 100 changes the torque command value of the motor 2, for example, based on detected information of a wheel speed sensor that detects the rotational speed of each of right and left drive wheels for running so that the drive force according to the requested output by the accelerator pedal operation or the like is transmitted to a road surface.

The engine control ECU 110 has a control program that controls the output of the engine 1 based on the power command value and the various sensor information and a plurality of maps M1 and M2. When the power command value is inputted, the engine control ECU 110 calculates the throttle opening degree that allows the engine output corresponding to the power command value to be obtained, fuel injection time (a fuel injection amount and an injection period), and ignition timing.

In addition, the engine control ECU 110 appropriately outputs a control signal in accordance with a plurality of control programs pre-stored in the ROM on the basis of the sensor information while performing communication with other vehicle-mounted ECUs. The sensor information may be replaced with set value information that is preset and stored in the ROM or the backup memory. For example, the engine control ECU 110 calculates the fuel injection amount according to the operation state of the engine 1 or an acceleration request. Then, the engine control ECU 110 outputs injection command signals to the first injectors 41 for port injection and the second injectors 51 for in-cylinder injection, a command signal to the injector driver circuit 50 for driving the suction control valve 56 or the like, as the control signal. Consequently, the engine control ECU 110 is configured to exert a plurality of functions for performing a restart-time injection control and an injection distribution control described later.

When the engine control ECU 110 cooperates with the hybrid drive control ECU 100 to execute the intermittent operation control of the engine 1, in accordance with the command signal from the hybrid drive control ECU 100 that commands the intermittent operation control, the engine control ECU 110 automatically stops the engine 1 and restart the engine 1 after the stop. Subsequently, when the engine 1 is restarted after the intermittent stop of the engine 1, the engine control ECU 110 significantly retards the ignition timing of the engine 1. By the retardation, the engine control ECU 110 retards the combustion in the combustion chamber 11*d* to such a degree that the combustion therein is performed in the exhaust stroke to increase an exhaust temperature. In this manner, the engine control ECU 110 executes a catalyst rapid warm-up control in which the first catalytic converters 32A and 32B and the second catalytic converters 35A and 35B are rapidly warmed up.

As shown in FIG. 2, to the input interface circuit side of the engine control ECU 110, there are connected the intake temperature sensor 26, the air flow meter 27, the throttle opening degree sensor 28, the air-fuel ratio sensor 36, the oxygen sensor 37, the water temperature sensor 71, the intake and exhaust cam angle sensors 72 and 73, the high fuel pressure sensor 74, the crank angle sensor 75, the accelerator depression amount sensor 76, a brake switch 77, the vehicle speed sensor 78, and the like. In addition, to a communication port 111 of the engine control ECU 110, other vehicle-mounted ECUs such as the brake control ECU 130 and the like are connected. To the output interface circuit side of the engine control ECU 110, there are connected a plurality of ignition coils 15*c* (in the first to sixth cylinders) of the ignition devices 15, an electronically controlled throttle motor 23m of the electronically controlled throttle valve 23, the injector driver circuit 50, a pair of an intake-side VVT oil control valve (OCV) 81 and an exhaust-side VVT OCV 82, a low-pressure pump drive circuit 44, and the suction control valve 56 The number of the plurality of ignition coils 15c corresponds to the number of cylinders of the engine 1 (e.g., six cylinders).

The engine control ECU 110 controls the pressure of the fuel pressurized and supplied (fed) to the high-pressure delivery pipes 53 from the high-pressure fuel pump 55 such that the pressure thereof becomes an optimum fuel pressure in accordance with the operation state of the engine 1 and injection characteristics of the second injectors 51 for in-cylinder injection (injectors for in-cylinder injection #1 to 6 in FIG. 2). At this point, the engine control ECU 110 controls the pressure of the fuel by adjusting the leakage amount of the fuel from the pressure chamber 55a by the suction control valve 56 or further adjusting the drive rpm of the high-pressure fuel pump 55.

Specifically, during a fuel pressurizable period, the engine control ECU 110 sets ON time when the electromagnetic drive coil of the suction control valve 56 is brought into an excited state and sets OFF time when the excited state is released. Then, the engine control ECU 110 variably controls the discharge amount of the high-pressure fuel pump 55 by changing the ratio of the ON time in its signal cycle (0% to 100%; hereinafter referred to as a duty ratio). The fuel pressurizable period mentioned herein is a period when the drive cam 55c of the high-pressure fuel pump 55 is driven by the rotational power from the engine 1 and the plunger 55b is driven in the fuel pressurization direction.

In addition, the engine control ECU 110 reduces the pumping loss of the engine 1 by a retarded-closing control that retards the valve-closing timing of the intake valve 13. Further, the engine control ECU 110 executes a retarded-opening control that opens the intake valve 13 after the piston 12 passes an exhaust top dead center. Furthermore, the engine control ECU 110 suppresses the amount of exhaust gas blown back into the intake port 11a or the combustion chamber 11d by eliminating what is called a valve overlap in a cold condition. Alternatively, the engine control ECU 110 controls the valve-closing timing of the intake valve 13 according to the inertia of intake air by retarding the valve-closing timing of the intake valve 13 according to the engine rotation speed to thereby improve volume efficiency. The engine control ECU 110 includes the map M1 for executing such a valve timing control.

Moreover, the engine control ECU 110 automatically stops the engine 1 according to the command signal from the hybrid drive control ECU 100 when the intermittent operation control is executed by the hybrid drive control ECU 100. After the stop of the engine 1, the engine control ECU 110 restarts the engine 1 according to the command signal from the hybrid drive control ECU 100. At the time of the restart, the engine control ECU 110 retards the combustion in the combustion chamber 11d to such a degree that the combustion therein is performed in the exhaust stroke by significantly retarding the ignition timing of the engine 1 to thereby increase the exhaust temperature. In this manner, the engine control ECU 110 executes the catalyst rapid warm-up control in which the first catalytic converters 32A and 32B and the second catalytic converters 35A and 35B are rapidly warmed up.

In addition, when the engine control ECU 110 restarts the engine 1 after the temporary stop due to the intermittent operation control, the engine control ECU 110 starts the operation of the engine 1 only by the port injection by the first injectors 41 for port injection (the injectors for port injection #1 to 6 in FIG. 2). Further, the engine control ECU 110 prohibits the output of the injection command signal to the second injectors 51 for in-cylinder injection until the fuel pressure in the high-pressure delivery pipes 53 detected by the high fuel pressure sensor 74 reaches a preset reference set pressure. Subsequently, the engine control ECU 110 starts the output of the injection command signal to the second injectors 51 for in-cylinder injection on a condition that the pressure of the fuel for in-cylinder injection detected by the high fuel pressure sensor 74 reaches the reference set pressure. The fuel pressure in the high-pressure delivery pipes 53 described herein is the pressure of the fuel for in-cylinder injection.

That is, when the engine control ECU 110 restarts the engine 1 that is temporarily stopped due to the intermittent operation control, the engine control ECU 110 operates the engine 1 only by the port injection from the first injectors 41 until the pressure of the fuel for in-cylinder injection reaches the reference set pressure. When the pressure of the fuel for in-cylinder injection reaches the reference set pressure, the engine, control ECU 110 starts the in-cylinder injection from the second injectors 51.

Further, when the engine control ECU 110 executes the catalyst rapid warm-up control in which the first catalytic converters 32A and 32B and the second catalytic converters 35A and 35B are rapidly warmed up, the engine control ECU 110, until the pressure of the fuel for in-cylinder injection reaches the reference set pressure, gradually retards the ignition timing of the engine 1 from the most advanced angle position in a state where the engine 1 is operated only by the port injection. Subsequently, when the pressure of the fuel for in-cylinder injection reaches the reference set pressure, the engine control ECU 110 starts the in-cylinder injection from the second injectors 51, and further retards the ignition timing of the engine 1.

More specifically, during the operation of the engine 1 only by the port injection and also during a non-warm-up-waiting port injection period, the engine control ECU 110 opens the suction control valve 56 to leak the fuel in the pressure chamber 55a of the high-pressure fuel pump 55 to the low-pressure side, and stops the feed of the fuel for in-cylinder injection. The non-warm-up-waiting port injection period described herein is a period when the rapid warm-up of the first catalytic converters 32A and 32B and the second catalytic converters 35A and 35B is not requested.

Further, when the engine control ECU 110 restarts the engine 1 according to the input of the command signal from the hybrid drive control ECU 100, the engine control ECU 110 determines whether or not the request for the catalyst rapid warm-up is made. For example, within predetermined time after the crank rotational speed of the engine 1 exceeds a complete combustion rotational speed, the engine control ECU 110 determines that the start of the catalyst rapid warm-up is requested. Then, on a condition that the request for the catalyst rapid warm-up is made, the engine control ECU 110 closes the suction control valve 56 during a period when the plunger 55b is driven in the fuel pressurization direction. With this, the engine control ECU 110 causes the high-pressure fuel to be discharged from the high-pressure fuel pump 55 to the high-pressure delivery pipe 53 side, and also controls the valve-closing time of the suction control valve 56 to thereby control the discharge flow rate of the high-pressure fuel pump 55.

The suction control valve 56 of the high-pressure side fuel supply device 60 serves as a discharge control mechanism that changes the supply amount of the fuel for in-cylinder injection per unit time according to the duty ratio of the drive signal from the engine control ECU 110. The duty ratio for driving the suction control valve 56 is set to the maximum duty ratio, e.g., 100% by the engine control ECU 110 on a condition that the start of the rapid warm-up of the first catalytic converters 32A and 32B and the second catalytic converters 35A and 35B is requested during the operation of the engine 1 only by the port injection.

Incidentally, when the pressure of the fuel for in-cylinder injection reaches the reference set pressure at the time of restart of the engine 1 and the in-cylinder injection from the second injectors 51 is started, the ratio between the fuel injection amount from the first injectors 41 by the port injection and the fuel injection amount from the second injectors 51 by the in-cylinder injection is controlled to correspond to a preset specific injection ratio. The injection ratio mentioned herein is represented by, e.g., X=the fuel injection amount of the port injection per stroke [mm³/st]/the total fuel injection amount per stroke [mm³/st]. That is, the injection ratio is represented by the ratio of the port injection to the total fuel injection (hereinafter referred to as a port injection ratio). Note that the ratio of the fuel injection amount of the in-cylinder injection per stroke [mm³/st] is represented by (1−X).

In addition, the engine control ECU 110 includes the map M2 that separates the operation region of the engine 1 into a port injection operation region where only the port injection is executed, a mixed injection operation region where the port injection and the in-cylinder injection are used in combination, and an in-cylinder injection operation region where only the in-cylinder injection is executed. For example, the engine control ECU 110 causes the first injectors 41 and further the second injectors 51 to selectively execute the port injection or the mixed injection at the time of the warm-up at the start of the engine 1, or of a low-rotation and high-load operation of the engine 1.

Note that a conventional evaporated fuel treatment device 90 is provided between the fuel tank 46 and the intake pipe 22. The evaporated fuel treatment device 90 causes evaporated fuel occurring in the fuel tank 46 to be absorbed and held by a canister 91 and released into the intake pipe 22 from the canister 91 during the intake of the engine 1. The evaporated fuel treatment device 90 adjusts the opening degree of a purge passage 92 between the canister 91 and the intake pipe 22 via a vacuum solenoid valve 93 controlled by the engine control ECU 110. In this manner, the evaporated fuel treatment device 90 adjusts the purge amount of the evaporated fuel sucked into the intake pipe 22 from the canister 91.

Next, the operation thereof will be described.

In the control apparatus for the hybrid vehicle of the embodiment configured in the manner described above, the intermittent operation control is executed in accordance with the running state of the hybrid vehicle. In the intermittent operation control, the hybrid vehicle is run with the hybrid drive device 3 while the engine 1 is intermittently operated. Consequently, the engine 1 relatively frequently repeats the automatic stop and the restart. In addition, when the temperature of each of the first catalytic converters 32A and 32B and the second catalytic converters 35A and 35B becomes lower than a catalyst activation temperature because the time when the engine 1 intermittently stops becomes relatively long, the catalytic function thereof is lowered. As a result, at the time of restart of the engine 1 after the stop, it becomes necessary to perform the rapid warm-up of the first catalytic converters 32A and 32B and the second catalytic converters 35A and 35B.

In the above case, when the engine control ECU 110 restarts the engine 1 according to the command signal from the hybrid drive control ECU 100, the engine control ECU 110 retards the combustion in the combustion chamber 11d to such a degree that the combustion therein is performed in the exhaust stroke by significantly retarding the ignition timing of the engine 1 to thereby increase the exhaust temperature. With this, the engine control ECU 110 executes the catalyst rapid warm-up control in which the first catalytic converters 32A and 32B and the second catalytic converters 35A and 35B are rapidly warmed up.

FIG. 4 shows the general flow of a restart-time fuel injection control program executed by the engine control ECU 110 at every restart after the intermittent stop of the engine 1.

The restart-time fuel injection control is started when the command signal from the hybrid drive control ECU 100 that requests the restart of the engine 1 is acquired after the automatic stop due to the intermittent operation of the engine 1.

First, various information and required setting information are captured into the engine control ECU 110 (Step S11).

Next, the fuel injection amount and the like are calculated and restart conditions are set (Step S12). The restart conditions include a condition regarding the optimum ignition timing and injection timing, a condition that the port injection ratio is set to 100%, and the like.

Subsequently, after the feed pump 45 as the low-pressure fuel pump is driven (Step S13), the engine 1 is cranked and the fuel injection from the first injectors 41 is started. That is, the operation of the engine 1 is started only by the port injection (Step S14). At the time of start of the operation, the ignition timing of the engine 1 is set at the most advanced angle position in order to secure combustion stability.

Then, in a case where the start of the catalyst rapid warm-up is requested, a first ignition retardation control is started, and the ignition timing of the engine 1 is gradually retarded. Herein, the first ignition retardation control is an ignition retardation control in the state of the operation only by the port injection. In addition to this, the high-pressure fuel pump 55 starts to be driven at the maximum drive duty ratio (Step S15). For example, within predetermined time after the crank rotational speed of the engine 1 exceeds a complete combustion rotational speed, the engine control ECU 110 determines that the start of the catalyst rapid warm-up is requested.

Next, it is determined whether or not the fuel pressure in the high-pressure delivery pipe 53 detected by the high fuel pressure sensor 74 reaches a preset reference set pressure P2 (Step S16). This determination process is repeated until the fuel pressure in the high-pressure delivery pipe 53 reaches the reference set pressure P2.

Subsequently, when the fuel pressure in the high-pressure delivery pipe 53 reaches the reference set pressure P2 (in the case of YES in Step S16), the injection command signal to the second injector 51 for in-cylinder injection is outputted at the injection ratio at the time of start of the injection distribution set based on the map M2 or the like. Then, direct fuel injection into the combustion chamber 11d by the second injector 51 is started (Step S17). At this point, a second ignition retardation control is executed, the exhaust temperature is further increased, and the first catalytic converters 32A and 32B and the second catalytic converters 35A and 35B are rapidly warmed up. In the second ignition retardation control, the ignition timing of the engine 1 is further retarded from the ignition timing thereof at the time of the first ignition retardation control.

Then, it is determined whether or not the end condition of the catalyst rapid warm-up control is satisfied (Step S18). For example, when time that allows each of the first catalytic converters 32A and 32B and the second catalytic converters 35A and 35B to reach the catalyst activation temperature elapses, or when the catalyst temperature reaches a predetermined temperature, it is determined that the end condition of the catalyst rapid warm-up control is satisfied. That is, the determination in Step S18 is YES and the present process is ended.

FIG. 5 shows the general flow of a high-pressure fuel pump drive control program executed concurrently with the fuel injection control for the catalyst rapid warm-up at the time of the restart. This process is repeatedly executed at every predetermined time interval or executed at least once every time the injection ratio is updated.

First, it is determined whether or not the set value of the port injection ratio that determines the injection ratio is 100% (Step S21).

At this point, when the set value of the port injection ratio is not 100%, the in-cylinder injection is requested. Hence, the drive duty ratio of the high-pressure fuel pump 55 is, variably controlled in a range larger than 0% in accordance with the injection ratio and the fuel injection amount. Thus, the discharge flow rate of the high-pressure fuel pump 55 is controlled so as to satisfy the required amount (Step S25).

On the other hand, when the set value of the port injection ratio is 100% (in the case of YES in Step S21), it is then determined whether or not a catalyst rapid warm-up control waiting state is established (Step S22). The catalyst rapid warm-up control waiting state is a state in which the start of the above catalyst rapid warm-up. control is requested.

At this point, when the catalyst rapid warm-up control waiting state is established (in the case of YES in Step S22), the drive duty ratio of the high-pressure fuel pump 55 is then set to the maximum value, e.g., 100%, and the high-pressure fuel pump 55 is operated at the maximum discharge flow rate in order to increase the fuel pressure in the high-pressure delivery pipe 53 (Step S23).

On the other hand, when the engine 1 is operated only by the port injection and the catalyst rapid warm-up control waiting state is not established (in the case of NO in Step S22), the drive duty ratio of the high-pressure fuel pump 55 is then set to 0%. That is, the feed and supply of the high-pressure fuel by the high-pressure fuel pump 55 are stopped (Step S24).

FIG. 6 shows a change in fuel injection state at the time of restart of the engine 1 in which the above restart-time fuel injection control and high-pressure pump drive control of the engine 1 are executed.

As indicated by the solid line in FIG. 6, in the embodiment, the feed pump 45 is firstly driven and the restart operation of the engine 1 is started at the port injection ratio of 100%. Subsequently, when the catalyst rapid warm-up control waiting state is established, the drive duty ratio of the high-pressure fuel pump 55 (a high-pressure pump drive duty) is set to the maximum value at the time of the restart operation. In response to this, until the actual fuel pressure detected by the high fuel pressure sensor 74, i.e., the pressure of the fuel for in-cylinder injection reaches the reference set pressure P2, the high-pressure fuel pump 55 is driven at the maximum discharge flow rate in the state of the operation of the engine 1 only by the port injection, and the pressure of the fuel for in-cylinder injection is increased. Subsequently, when the pressure of the fuel for in-cylinder injection reaches the reference set pressure P2, the port injection ratio is set to preset X % (e.g., 60%), and the dual injection (the port injection and the in-cylinder injection) is started. In the dual injection, X % of the required fuel injection amount is used in the port injection and the remaining portion (100–X %) is used in the in-cylinder injection.

The broken line in FIG. 6 indicates a change in the fuel injection state of the related art. As shown in FIG. 6, in the related art, when the catalyst rapid warm-up control waiting state is established, the dual injection is immediately started. Accordingly, in the related art, the direct injection amount becomes insufficient due to injection interruption resulting from an insufficient fuel pressure until the pressure of the fuel for in-cylinder injection approaches the reference set pressure P2. As a result, when compared to the embodiment, a sharp fluctuation in air-fuel ratio that is compensated by an air-fuel ratio feedback control becomes likely to occur. Consequently, an air-fuel ratio variation shown in FIG. 6 as an example becomes likely to occur.

In contrast to this, in the embodiment, when the engine 1 is restarted after the temporary stop due to the intermittent operation, the engine 1 is initially operated only by the port injection and, when the pressure of the fuel for in-cylinder injection reaches the reference set pressure P2, the in-cylinder injection is started. Consequently, the catalyst rapid warm-up is reliably executed without causing the variation in air-fuel ratio (corresponding to the detected air-fuel ratio of the air-fuel ratio sensor 36) by a fluctuation in in-cylinder injection amount due to a retarded increase in the pressure of the fuel for in-cylinder injection. As a result, when the engine 1 is restarted, required exhaust gas purification performance by the first catalytic converters 32A and 32B and the second catalytic converters 35A and 35B is sufficiently secured.

In addition, in the embodiment, during the operation of the engine 1 only by the port injection and also during the non-warm-up-waiting port injection period when the rapid warm-up of the first catalytic converters 32A and 32B and the second catalytic converters 35A and 35B is not requested, the feed and supply of the fuel for in-cylinder injection by the high-pressure fuel pump 55 are stopped. On the condition that the start of the catalyst rapid warm-up is requested, the feed and supply of the fuel for in-cylinder injection are started. Consequently, when the engine 1 is operated only by the port injection and the catalyst rapid warm-up control waiting state is not established, the supply of the pressure of the fuel for in-cylinder injection is stopped so that unnecessary driving of the high-pressure pump is not performed.

When the catalyst rapid warm-up control waiting state is established, the feed of the fuel for in-cylinder injection is started, and hence the pressure of the fuel for in-cylinder injection is increased to the reference set pressure P2 during the operation by the port injection. As a result, the in-cylinder injection is started in a state where a fine injection amount control can be performed. Accordingly, required combustion stability that allows significant retardation of the ignition of the engine 1 is secured.

Further, in the embodiment, at the time of restart of the engine 1, the low-pressure side fuel supply device 40 is activated and the operation of the engine 1 is started. Consequently, a reduction in the control accuracy of the fuel injection amount resulting from the insufficient fuel pressure is suppressed at the time of start of the restart operation of the engine 1.

In addition, in the embodiment, when the engine 1 is operated only by the port injection and the start of the rapid warm-up of the first catalytic converters 32A and 32B and the second catalytic converters 35A and 35B is requested, the duty ratio of the drive signal to the suction control valve 56 is set to the maximum value. At this point, the suction control valve 56 serves as the discharge control mechanism of the high-pressure side fuel supply device 60. Accordingly, it is possible to quickly increase the pressure of the fuel for in-cylinder injection at the time of restart of the engine 1. In this manner, the rapid warm-up of the first catalytic converters 32A and 32B and the second catalytic converters 35A and 35B is quickly completed.

In addition, in the embodiment, when the in-cylinder injection is started, the fuel injection amount by the port injection and the fuel injection amount by the in-cylinder injection are controlled, and the injection ratio therebetween corresponds to the preset specific injection ratio. As a result, the fine injection amount control and the sufficient fuel injection amount are secured, and the stable and effective catalyst rapid warm-up is executed.

Further, in the embodiment, under the drive condition for running of a vehicle in which the efficiency of the engine 1 is reduced, i.e., during the stop of the engine 1 due to the intermittent operation control, the vehicle is run with the motor 2. Therefore, the efficiency of the hybrid drive device 3 as the running drive source is improved and the fuel efficiency of the hybrid vehicle is improved. Furthermore, in the case where the intermittent operation of the engine 1 is performed, although the frequency of the restart of the engine 1 is increased, the fluctuation in in-cylinder injection amount resulting from the retarded increase in the pressure of the fuel for in-cylinder injection is suppressed, and the catalyst rapid warm-up is quickly and reliably executed. Consequently, the required exhaust gas purification performance at the time of restart of the engine 1 is sufficiently secured.

Thus, in the embodiment, when the engine 1 is restarted after the temporary stop due to the intermittent operation, the engine 1 is operated only by the port injection until the pressure of the fuel for in-cylinder injection reaches the reference set pressure P2. When the pressure of the fuel for in-cylinder injection reaches the reference set pressure P2, the in-cylinder injection is started. Consequently, the catalyst rapid warm-up is reliably executed without causing the air-fuel ratio variation by the fluctuation in in-cylinder injection amount resulting from the retarded increase in the pressure of the fuel for in-cylinder injection. As a result, there is provided the control apparatus for the hybrid vehicle in which the required exhaust gas purification performance by the first catalytic converters 32A and 32B and the second catalytic converters 35A and 35B is sufficiently secured.

In the above-described embodiment, in the catalyst rapid warm-up, the combustion is retarded to be performed in the exhaust stroke by retarding the ignition timing of the engine 1 to retard the combustion. Thus, the increase in the temperature of the catalyst in each of the first catalytic converters 32A and 32B and the second catalytic converters 35A and 35B is thereby facilitated. On the other hand, in addition to this, the catalyst may be heated by exhaust heat recovery. Alternatively, catalyst heating may also be performed by electrifying an electrically heated catalyst (EHC) before the start of the engine 1. In addition, the maximum value of the drive duty ratio of the high-pressure fuel pump 55 at the time of restart of the engine 1 does not need to be 100%.

Thus, the invention provides the control apparatus for the hybrid vehicle in which the catalyst rapid warm-up is reliably executed without causing the air-fuel ratio variation by the fluctuation in in-cylinder injection amount resulting from the retarded increase in the pressure of the fuel for in-cylinder injection. The control apparatus for the hybrid vehicle sufficiently secure the required exhaust gas purification performance of the catalytic converter. The invention is useful as the control apparatuses for the hybrid vehicle in general in which, of the internal combustion engine capable of the in-cylinder injection and the motor that constitute the running drive source, the internal combustion engine is intermittently operated.

What is claimed is:

1. A control apparatus provided in a hybrid vehicle, wherein the hybrid vehicle includes a running drive source and a catalytic converter for exhaust gas purification, the running drive source has a motor and an internal combustion engine configured to execute in-cylinder injection and port injection, and the catalytic converter is provided on an exhaust path of the internal combustion engine, the control apparatus comprising
an electronic control unit that is configured to:
execute an intermittent operation control in which, while the internal combustion engine is intermittently operated, the hybrid vehicle is run with the running drive source;
execute a catalyst rapid warm-up control in which the catalytic converter is rapidly warmed up by retarding ignition time of the internal combustion engine, when the internal combustion engine is restarted after a stop of the internal combustion engine due to the intermittent operation control;
operate the internal combustion engine only by the port injection until a pressure of fuel for the in-cylinder injection reaches a preset reference set pressure, when the internal combustion engine is restarted; and
start the in-cylinder injection when the pressure of the fuel for the in-cylinder injection reaches the preset reference set pressure.

2. The control apparatus according to claim 1, wherein:
the electronic control unit is configured to stop feed of the fuel for the in-cylinder injection during the operation of the internal combustion engine only by the port injection and also during a non-warm-up-waiting port injection period;
the electronic control unit is configured to start the feed of the fuel for the in-cylinder injection when a start of the catalyst rapid warm-up control is requested; and
the catalyst rapid warm-up control is not requested during the non-warm-up-waiting port injection period.

3. The control apparatus according to claim 1, wherein:
the hybrid vehicle includes a low-pressure side fuel supply device and a high-pressure side fuel supply device;
the low-pressure side fuel supply device is configured to supply fuel for the port injection to the internal combustion engine;
the high-pressure side fuel supply device is configured to supply the fuel for the in-cylinder injection to the internal combustion engine; and
the electronic control unit is configured to, when the internal combustion engine is restarted, activate the low-pressure side fuel supply device and start the operation of the internal combustion engine.

4. The control apparatus according to claim 3, wherein:
the electronic control unit is configured to set a duty ratio of a drive signal for the high-pressure side fuel supply device;
the high-pressure side fuel supply device includes a discharge control mechanism that changes a supply amount of the fuel for the in-cylinder injection per unit time in accordance with the duty ratio; and
when a start of the catalyst rapid warm-up control is requested during the operation of the internal combustion engine only by the port injection, the electronic control unit is configured to set the duty ratio to a maximum value.

5. The control apparatus according to claim 1, wherein:
the electronic control unit is configured to control a fuel injection amount by the port injection and a fuel injection amount by the in-cylinder injection to correspond to a preset injection ratio.

6. The control apparatus according to claim 1 wherein:
the hybrid vehicle is run with the motor during the stop of the internal combustion engine due to the intermittent operation control.

7. A hybrid vehicle comprising:
a running drive source including a motor and an internal combustion engine configured to execute in-cylinder injection and port injection;
a catalytic converter for exhaust gas purification provided on an exhaust path of the internal combustion engine; and
an electronic control unit that is configured to execute an intermittent operation control, execute a catalyst rapid warm-up control when the internal combustion engine is restarted after a stop of the internal combustion engine due to the intermittent operation control, operate the internal combustion engine only by the port injection until a pressure of fuel for the in-cylinder injection reaches a preset reference set pressure when the internal combustion engine is restarted, and start the in-cylinder injection when the pressure of the fuel for the in-cylinder injection reaches the preset reference set pressure,
wherein: in the intermittent operation control, the hybrid vehicle is run with the running drive source while the internal combustion engine is intermittently operated; and
in the catalyst rapid warm-up control, the catalytic converter is rapidly warmed up by retarding ignition time of the internal combustion engine.

8. The hybrid vehicle according to claim 7, wherein:
the electronic control unit is configured to stop feed of the fuel for the in-cylinder injection during the operation of the internal combustion engine only by the port injection and also during a non-warm-up-waiting port injection period;
the electronic control unit is configured to start the feed of the fuel for the in-cylinder injection when a start of the catalyst rapid warm-up control is requested; and
the catalyst rapid warm-up control is not requested during the non-warm-up-waiting port injection period.

9. The hybrid vehicle according to claim 7, further comprising:
a low-pressure side fuel supply device configured to supply fuel for the port injection to the internal combustion engine; and
a high-pressure side fuel supply device configured to supply the fuel for the in-cylinder injection to the internal combustion engine,
wherein the electronic control unit is configured to, when the internal combustion engine is restarted, activate the low-pressure side fuel supply device and start the operation of the internal combustion engine.

10. The hybrid vehicle according to claim 9, wherein:
the electronic control unit is configured to set a duty ratio of a drive signal for the high-pressure side fuel supply device;
the high-pressure side fuel supply device includes a discharge control mechanism that changes a supply amount of the fuel for the in-cylinder injection per unit time in accordance with the duty ratio of the drive signal; and when a start of the catalyst rapid warm-up control is requested during the operation of the internal combustion engine only by the port injection, the electronic control unit is configured to set the duty ratio to a maximum value.

11. A control method for a hybrid vehicle, wherein the hybrid vehicle includes an electronic control unit, a running drive source and a catalytic converter for exhaust gas purification, the running drive source has a motor and an internal combustion engine configured to execute in-cylinder injection and port injection, and the catalytic converter is provided on an exhaust path of the internal combustion engine, the control method comprising:
executing, by the electronic control unit, an intermittent operation control in which, while the internal combustion engine is intermittently operated, the hybrid vehicle is run with the running drive source;
executing a catalyst rapid warm-up control, by the electronic control unit, in which the catalytic converter is rapidly warmed up by retarding ignition time of the internal combustion engine, when the internal combustion engine is restarted after a stop of the internal combustion engine due to the intermittent operation control;
operating the internal combustion engine, by the electronic control unit, only by the port injection until a pressure of fuel for the in-cylinder injection reaches a preset reference set pressure when the internal combustion engine is restarted; and
starting the in-cylinder injection, by the electronic control unit, when the pressure of the fuel for the in-cylinder injection reaches the preset reference set pressure.

12. The control method according to claim 11, further comprising:
stopping feed of the fuel for the in-cylinder injection, by the electronic control unit, during the operation of the internal combustion engine only by the port injection and also during a non-warm-up-waiting port injection period; and
starting the feed of the fuel for the in-cylinder injection, by the electronic control unit, when a start of the catalyst rapid warm-up control is requested,
wherein the catalyst rapid warm-up control is not requested during the non-warm-up-waiting port injection period.

13. The control method according to claim 11, further comprising
when the internal combustion engine is restarted, supplying fuel for the port injection to the internal combustion engine and also starting the operation of the internal combustion engine, by the electronic control unit.

14. The control method according to claim 13, further comprising:
changing a supply amount of the fuel for the in-cylinder injection per unit time in accordance with a duty ratio of a drive signal, by the electronic control unit; and
when the start of the catalyst rapid warm-up control is requested during the operation of the internal combustion engine only by the port injection, setting the duty ratio to a maximum value.

15. The control method according to claim 11, further comprising:
when the in-cylinder injection is started, controlling, by the electronic control unit, a fuel injection amount by the port injection and a fuel injection amount by the in-cylinder injection to correspond to a preset injection ratio.

* * * * *